April 30, 1957  H. A. STAMPER ET AL  2,790,913
SERVO COMPASS
Filed Feb. 8, 1954  2 Sheets-Sheet 1
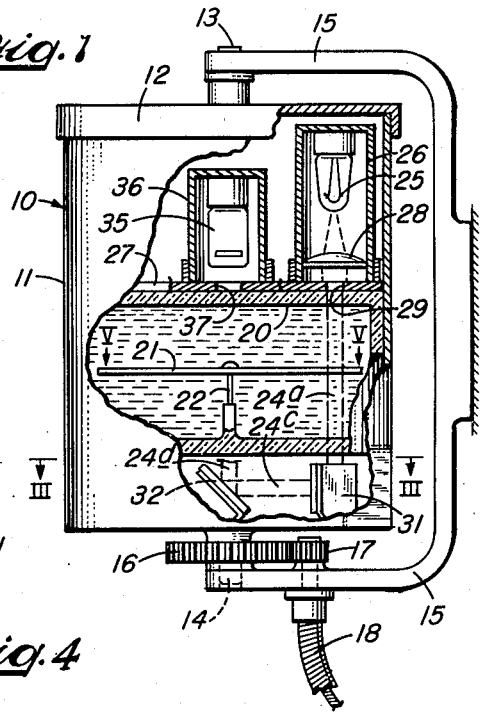
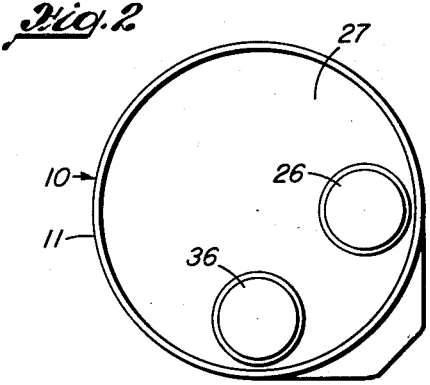
H. A. Stamper
E. Woodbury
  INVENTORS
BY *Woodbury*
ATTORNEY

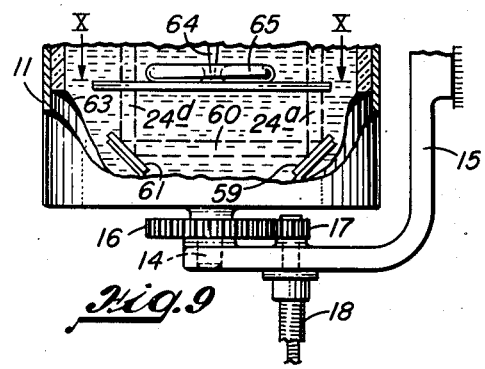
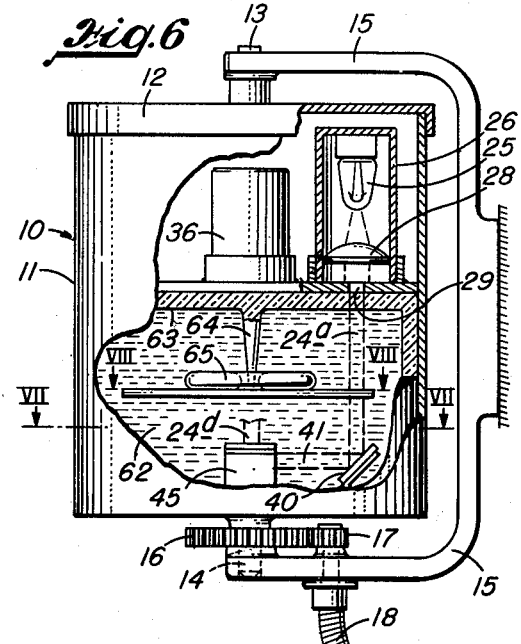
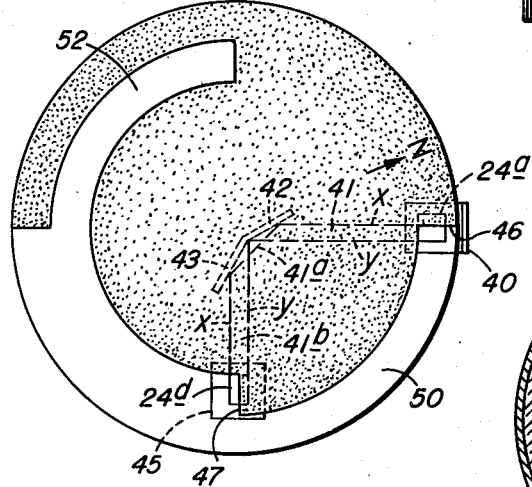
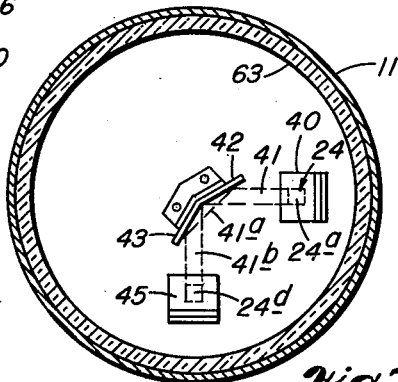
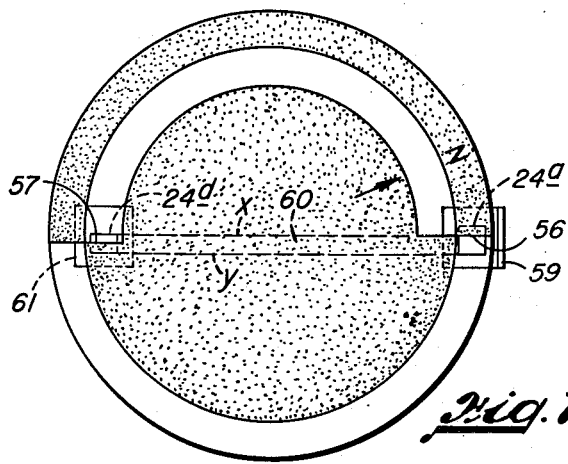

United States Patent Office 2,790,913
Patented Apr. 30, 1957

2,790,913

SERVO COMPASS

Hamilton A. Stamper, Los Angeles, and Eugene Woodbury, Altadena, Calif., assignors to Bendix Aviation Corporation, North Hollywood, Calif., a corporation of Delaware Application February 8, 1954, Serial No. 408,913

7 Claims. (Cl. 250—233)

This invention relates to compasses for the electrical control of apparatus such as automatic steering.

Such compasses are referred to herein as servo compasses, to distinguish them from compasses that merely give a visual indication of a course.

An object of the invention is to simplify and reduce the cost of servo compasses of the photoelectric type.

Another object is to increase the sensitivity of such compasses.

Other more specific objects and features of the invention will appear from the description to follow.

The present invention is applicable, although not limited in its utility, to the particular type of servo compass disclosed in application Serial No. 353,214 of H. A. and F. H. Stamper, filed May 5, 1953. The prior application discloses that if two light beams are projected past two radial edges of a compass card spaced 90° apart onto a photocell, tilting of the compass case from its normal vertical axis does not alter the total amount of light reaching the photocell, thereby enabling the elimination of the usual gimbals for leveling the compass. This makes possible substantial reductions in cost of manufacture.

In the present invention the same feature of two 90° spaced radial beam-intercepting edges on the compass card may be utilized to eliminate need for gimbals. However, whereas the compass of the prior application generated two separate light beams which were directed past the 90° spaced edges of the card onto the photocell, the compass of the present invention directs a single beam of light successively past the two edges by means of mirrors. The mirror arrangement is such that opposite sides of the beam are intercepted by the two different edges of the card. This not only enables each edge to affect the amount of light reaching the photocell independently of the other edge, but causes the two edges to cumulatively vary the total amount of light reaching the photocell. This increases the sensitivity of response of the photocell to a given compass deflection and may be used with two beams spaced other than 90° apart when it is not necessary that the optical system compensate for errors resulting from tilting.

A full understanding of the invention may be had from the following detailed description when read in connection with the drawing, in which:

Fig. 1 is an elevational view, with portions shown in section, of one embodiment of the present invention.

Fig. 2 is a plan view of the device of Fig. 1 with the top cover removed.

Fig. 3 is a horizontal section taken in the plane III—III of Fig. 1.

Fig. 4 is a schematic diagram illustrating the optical system of Fig. 1.

Fig. 5 is a plan view taken in the plane V—V of Fig. 1.

Fig. 6 is an elevational view with parts broken away, similar to Fig. 1 but showing another embodiment of the invention.

Fig. 7 is a horizontal section taken in the plane VII—VII of Fig. 6.

Fig. 8 is a plan view taken in the plane VIII—VIII of Fig. 6.

Fig. 9 is a side elevational view similar to the lower portion of Fig. 6, but showing an alternative construction.

Fig. 10 is a plan view taken in the plane X—X of Fig. 9.

Referring first to Fig. 1, the servo compass therein disclosed comprises a frame 10 consisting of a generally cylindrical case 11 having a normally vertical axis and closed at the top by a cover 12. The frame 10 is rotatably supported by axial trunnions 13 and 14 at its upper and lower ends, respectively, which are rotatably supported by bearings in a bracket 15 that may be secured to a wall or other rigid support. The frame 10 is adapted to be adjustably rotated into different positions about its axis, and to this end there is provided a gear 16 secured to the trunnion 14 and meshing with a pinion 17 which may be rotated from a remote point by a conventional flexible drive shaft 18.

Contained within the casing 10 is a sealed, transparent compass bowl 20 which, as shown, is of cylindrical shape, is filled wtih liquid in conformance with standard practice, and contains a compass card 21 which is pivotally supported with its center in the axis of the casing 10 by the usual pivot 22. As shown in Fig. 5, the card 21 of any permanent magnetic material is magnetized to orient itself with the earth's magnetic field and has four blades 21a, each of substantially 45° arcuate extent and spaced from the adjacent edge of the next plate by 45°. Only two adjacent blades 21a are active in the optical system of the compass, the other two merely serving to balance the card and provide the desired volume of magnetic material. The two active blades have light-intercepting radial edges 22 and 23, respectively, each positioned on the clockwise margin of its associated blade 21a. Each of the edges 22 and 23 moves through an arcuate locus in response to rotation of the card and both are normally positioned in partial intercepting relation with a light beam 24 which is directed downwardly past the edge 22 and upwardly past the edge 23. Because both the edges 22 and 23 face in the same arcuate direction, which arcuate direction is clockwise in Fig. 5, angular motion of the card about the pivot 22 causes both edges to move simultaneously into or out of the light beam.

Thus, referring to Fig. 1, there is provided a means for directing the light beam downwardly past the card edge 22, which means comprises a lamp 25 positioned in a housing 26 supported on a partition wall 27 in the case 10 at a point radially displaced from the axis of the case. A condensing lens 28 may be incorporated in the housing 26 to convert light rays emanating from the lamp 25 into substantially parallel relation in the beam 24, the outline of which beam is defined by a window 29 in the partition 27. As shown in Fig. 5, the beam may be square in cross section.

The beam is first directed downwardly parallel to the axis of the case in one control path 24a past the compass card 21 through the locus of the one edge 22 and through the bottom wall of the compass bowl where it is deflected by a light-deflecting means so constructed and arranged as to redirect the beam upwardly through another control path 24d through the locus of the other card edge 23 and into a photocell 35 positioned in a housing 36 mounted on the partition 27 and displaced 90° about the axis of the case from the lamp housing 26. A window 37 is provided in the partition 27 to admit the beam to the photocell 35. The light-deflecting means also inverts the beam arcuately between the first and second control paths whereby the card edges 22 and 23, respectively, intercept opposite sides of the beam to cumulatively reduce its cross-sectional area as the card edges cut into the beam. Thus, as shown in Fig. 5, the card edge 22 intercepts one side x of the beam, whereas the card edge 23 intercepts the opposite side y of the beam. This result is obtained by the following light-deflecting structure.

Referring to Figs. 1 and 3, the light beam 24 is reflected by a first mirror 30 from the control path 24a into a first tangential path extending horizontally and substantially tangentially (with respect to the vertical axis of the casing) onto a second plane mirror 31 positioned in a vertical plane and at 45° to the path 24b so that it reflects the beam through a second tangential path 24c extending at right angles to the path 24b, but in the same horizontal plane, onto a third mirror 32 which reflects the beam upwardly into the other control path 24d.

It will be observed that after reflection of the beam from the control path 24a into the horizontal path 24b, the side x of the beam is at the top, and the side y is at the bottom, and this relation is not altered by the mirror 31, so that when the beam impinges on the mirror 32 the x side thereof is still the top side, and the y side is still the bottom side. Because of the inclination of the mirror 32, it intercepts the bottom side of the beam in path 24c first and the top side last. Therefore, the side x of the beam in the control path 24d is displaced clockwise from the side y, whereas the reverse condition exists in the path 24a.

This inversion of the beam is more readily apparent from the schematic diagram of Fig. 4, which is taken along the curved line III—III in Fig. 3. The mirror 31 is shown in Fig. 4, but it does not produce any inversion of the beam in the vertical plane. Therefore, the inversion of the sides x and y of the beam is produced solely by the mirrors 30 and 32. It is readily apparent from inspection of Fig. 4 that the card edge 22 cuts into the x side of the beam in the control path 24a, and that the card edge 23 cuts into the y side of the beam in the other control path 24d. The result of this is that the reduction in the total cross-sectional area of the beam effected by the two edges 22 and 23 is cumulative and is twice as great as that produced by either edge alone. Hence, the percentage reduction of the total light in the beam is twice as great as it would be if only one edge 22 or 23 were employed.

On the other hand, if the beam were not inverted arcuately, both of the edges 22 and 23 would cut into the same side of the beam, and the two edges would produce no greater reduction in the cross section of the beam than would one alone. Furthermore, there would be no compensation for errors resulting from tilting of the casing from normal vertical position.

There is shown in Figs. 6 and 7 an alternative arrangement to that shown in Fig. 1 in which corresponding parts bear the same reference numerals. The difference is primarily in the arrangement of the light deflecting means below the compass card. Thus, in the arrangement of Fig. 1, the first plane mirror 30 deflects the beam tangentially onto a mirror 31 located at a greater radial distance from the axis than the mirrors 30 and 32. In Figs. 6 and 7 the first mirror 40 reflects the beam 24 from the path 24a into a path 41 extending radially inwardly toward the axis. This path 41 is intercepted by a plane mirror 42 which reflects the beam impinging thereon through a path 41a onto a second closely adjacent plane mirror 43, which in turn reflects the beam radially outwardly in a path 41b onto a plane mirror 45 which reflects it into the path 24d extending upwardly parallel to the axis and past the compass card which, as shown in Fig. 8, has two light-intercepting radial edges 46 and 47, respectively, corresponding in function to the light-intercepting edges 22 and 23 of Fig. 5. After passing the edge 47, the light beam is directed into a photocell 35 in a housing 36 the same as in Fig. 1.

The two mirrors 42 and 43 together constitute a double inversion mirror means to produce the same arcuate inversion of the beam that is produced with the arrangement of Figs. 1, 3 and 5. Thus it will be apparent that after reflection of the beam by the mirror 40, the side x of the beam intercepted by the card edge 46 which is the counter-clockwise side becomes the clockwise side of the beam in path 24d, and it is the side y of the beam that faces counter-clockwise and is intercepted by the card edge 47.

In the structure of Figs. 6, 7 and 8, one of the light-intercepting edges (in this instance, edge 47) is displaced radially inwardly from the other light-intercepting edge 46. This is advantageous in that it makes possible a transparent card portion 50 extending 180° from the edge 46 in clockwise direction and an opaque portion of the card extending 180° from the edge 46 in the other direction. Likewise, it makes possible a transparent portion 52 of the card extending 180° clockwise from the edge 47 and an opaque portion extending 180° counter-clockwise from that edge. This permits a deviation of 180° from the desired course while still producing a photoelectric current correctly indicating the direction of deviation. It will be obvious that in the arrangement of Fig. 5, the permissible deviation from course without producing a false signal is 45°.

There is shown in Figs. 9 and 10 a modification of the structure of Figs. 6, 7 and 8 in which the two paths 24a and 24d, in which the light is intercepted, and the light-intercepting edges of the card, are spaced 180° apart instead of 90°. As in Fig. 8, the card of Fig. 10 has its two light-intercepting edges 56 and 57 spaced different radial distances from the center to permit 180° rotation of the card without producing a false signal.

The light-deflecting means of the modification shown in Figs. 9 and 10 is simpler than that of Figs. 7 and 8, since there is no need for a special double inversion mirror arrangement such as the two mirrors 42 and 43. Thus, as shown in Fig. 9, one plane mirror 59 in the path 24a deflects the beam diametrically through a path 60 onto a second plane mirror 61, which directs it vertically into the path 24d. The required inversion of the beam is inherent, since the counter-clockwise side of the beam in path 24a automatically becomes the clockwise side in path 24d, and vice versa.

In Figs. 6, 7 and 8 and in Figs. 9 and 10, the light beam passes immediately below or close to the center of the card. The usual pivotal support for the card could be designed so as not to interfere with the light transmission, but it is also possible to eliminate a support below the card by making the card buoyant with respect to the liquid 62 within the bowl 63 and providing an inverted pivot 64 for engaging the card. The necessary buoyant characteristic of the card can be provided by a hollow doughnut-shaped float 65 secured to the upper side of the card in concentric relation to the card center. It will be noted that the construction of Figs. 6 to 10 further differs from that of Fig. 1, in that the light-deflecting means below the card is positioned within the compass bowl, whereas in Fig. 1 these elements are positioned below the bowl. It will be understood that, if desired, the light deflecting means of Fig. 1 can be positioned within the bowl instead of below it. Contrariwise, the light-deflecting means below the compass card in Figs. 6 to 10 could be positioned below the bowl, if desired.

Although for the purpose of explaining the invention, a particular embodiment thereof has been shown and described, obvious modifications will occur to a person skilled in the art, and we do not desire to be limited to the exact details shown and described.

We claim:

1. A servo compass comprising: a frame having an axis that is normally vertical; a compass card having its center at said axis and means supporting it from said frame for free rotation about its center in a horizontal plane, said card having a pair of radial light-intercepting edges angularly spaced apart about the center of said card and both facing in the same arcuate direction about said center; a lamp and a photocell supported on said frame on one side of said card; means for directing a beam of light from said lamp through one control path intercepting the locus of one of said edges to the other side of said card; light-deflecting means on said other side of said card for deflecting said beam into another control path intercepting the locus of the other edge of said card back to said photocell on said one side of said card, said two control paths being spaced from each other about said axis by the same angle as said card edges, whereby both card edges simultaneously intercept said beam in response to relative rotation between said card and frame.

2. A device according to claim 1 in which said light-deflecting means is so constructed and arranged as to invert the beam arcuately between said control paths, whereby said two card edges respectively intercept opposite sides of said beam to cumulatively vary its arcuate width.

3. A device according to claim 2 in which said two card edges are displaced substantially 90° apart about said card center, said two control paths are 90° displaced about said axis, and said light-deflecting means comprises: a first mirror for reflecting said beam from said one control path into a first tangential path; a second mirror for reflecting said beam from said first tangential path into a second tangential path intersecting said other control path; and a third mirror for reflecting said beam from said second tangential path into said other control path.

4. A device according to claim 2 in which said two card edges are displaced substantially 90° apart about said card center, said two control paths are 90° displaced about said axis, and said light-deflecting means comprises: a mirror for reflecting said beam from said one control path into a first radial path toward said axis; double inversion mirror means for reflecting said beam from said first radial path into a second radial path intersecting said other control path; and another mirror for reflecting said beam from said second radial path into said other control path.

5. A device according to claim 1 in which said two card edges are displaced approximately 180° apart about said card center and said two control paths are displaced approximately 180° about said axis, and said light-deflecting means comprises: a first mirror for reflecting said beam from said one control path into a transmitted path intersecting said other control path and a second mirror for deflecting said beam from said intermediate path into said other control path.

6. A device according to claim 1 in which said two card edges and said two control paths are at different radial distances from said card center and each of said edges constitutes one end of a separate arcuate window in said card extending approximately 180° from said edge.

7. A device according to claim 1 in which said means supporting said compass card comprises a sealed bowl containing said card and filled with liquid, said compass card is lighter than the liquid it displaces, whereby it is buoyant, and a pivot extends downwardy from the top of said bowl into engagement with said card at its center for rotatably supporting said card against upward movement.

References Cited in the file of this patent
UNITED STATES PATENTS

| | | |
|---|---|---|
| 2,112,504 | Mirfield | Mar. 29, 1938 |
| 2,364,644 | Mott et al. | Dec. 12, 1944 |
| 2,432,667 | Kettering et al. | Dec. 16, 1947 |
| 2,506,946 | Walker | May 9, 1950 |
| 2,576,760 | Jones et al. | Nov. 27, 1951 |